(12) United States Patent
Hart

(10) Patent No.: US 7,219,878 B1
(45) Date of Patent: May 22, 2007

(54) LIVE LOADED PACKING FOR VALVE

(75) Inventor: Charles A. Hart, Las Flores, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 80 days.

(21) Appl. No.: 11/263,308

(22) Filed: Oct. 31, 2005

(51) Int. Cl.
*F16J 15/18* (2006.01)

(52) U.S. Cl. .................. 251/214; 251/368; 277/523

(58) Field of Classification Search ........... 251/214, 251/368; 277/522, 523
See application file for complete search history.

(56) References Cited

U.S. PATENT DOCUMENTS

| | | | | |
|---|---|---|---|---|
| 589,725 | A | * | 9/1897 | Hodge et al. .............. 251/214 |
| 787,411 | A | * | 4/1905 | Swan ........................ 277/520 |
| 1,757,311 | A | * | 5/1930 | Kahle ........................ 277/517 |
| 2,143,825 | A | * | 1/1939 | Abramson ................. 277/523 |
| 2,373,020 | A | * | 4/1945 | Doster .................. 137/315.28 |
| 3,993,284 | A | * | 11/1976 | Lukens, Jr. ................ 251/63.6 |
| 4,394,872 | A | * | 7/1983 | Schobl ................. 137/315.28 |
| 4,773,442 | A | * | 9/1988 | Lephilibert ........... 137/315.28 |
| 4,886,241 | A | * | 12/1989 | Davis et al. ................ 251/214 |
| 5,024,453 | A | * | 6/1991 | Suggs ........................ 277/523 |
| 5,056,757 | A | * | 10/1991 | Wood ........................ 251/214 |
| 5,064,167 | A | * | 11/1991 | DiPalma .................... 251/214 |
| 5,290,010 | A | * | 3/1994 | Ridge ........................ 277/522 |
| 5,476,117 | A | * | 12/1995 | Pakula ...................... 137/312 |
| 6,120,006 | A | * | 9/2000 | Yamaki et al. ............. 251/214 |
| 6,622,987 | B2 | * | 9/2003 | Sterud ....................... 251/214 |

* cited by examiner

*Primary Examiner*—John Bastianelli
(74) *Attorney, Agent, or Firm*—Stetina Brunda Garred & Brucker

(57) ABSTRACT

In accordance with the present invention, there is provided a lie loaded packing assembly for a valve which comprises a valve body defining a passage having a valve stem moveably disposed therein and selectively moveable between open and closed positions. Extending about a portion of the valve stem is a packing. One end of a sleeve of the valve bears axially onto and compresses the packing, with a spigot of the valve being cooperatively engaged to the opposite end of the sleeve. A clamp of the valve is cooperatively engaged to the valve body, with a pair of bolts extending between and being secured to the clamp, the spigot, and a flange member which is itself cooperatively engaged to the spigot. The combination of the bolt, spigot and flange member provide an integral spring construction for the valve.

18 Claims, 3 Drawing Sheets

LIVE LOADED PACKING FOR VALVE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generally to valves, and more particularly to a live loaded packing assembly specifically suited for sealing the valve stem of a valve to the sleeve or passage in which the valve stem normally moves.

In typical valve construction, a valve stem may undergo a turning or sliding movement, or a combination of both movements, within its sleeve during the process of the valve moving between its open and closed configurations. In this regard, the sealing of the stem must be adequate to contend with such movement, while at the same time ensuring maintenance of fluid tightness against the pressure of the fluid in the valve. A widely used type of stem sealing is a compression packing in which a gland, which may be bolted or threaded, applies a compressive force to a soft compression packing in a stuffer box surrounding a portion of the length of the stem. The resulting radial pressure of the packing onto the stem provides the desired seal so long as the radial pressure exceeds the pressure of fluid in the valve.

In certain valve configurations, compression may be applied to the packing through the use of packing bolts which are each attached at one end to a clamp around the valve body, and at their other end to a spigot, a flange or other projection bearing on, integral with or attached to the gland or sleeve which bears onto the packing. In this particular arrangement, the tightening of the bolts increases the pressure on the packing, thus facilitating the application of radial pressure onto the stem.

In other valve configurations, it is known to attach a spring between the nut used to tighten the bolt and the surface of the spigot or flange. Although coil springs may be used, a conventional practice is to use Belleville springs which are essentially formed as a series of dished washers. Such springs have a higher compression rating than a simple coil spring, with the use of the Belleville springs providing a "live-loaded" packing which can automatically compensate for changes that may take place in the packing under operating conditions of the valve, such as high pressures and temperatures. Since the volume of the packing material may reduce under certain operating conditions, the spring pressure compensates for such reduction and maintains the required pressure, thus avoiding potential harmful effects to the sealing of the stem in an unsprung valve which could result from the reduction in the packing material volume. Alternatively, if the packing volume increases (which can happen with certain packing materials), the radial pressure of the stem in an unsprung valve could increase too much, thus possibly causing sticking of the stem. The spring value, however, can accommodate the pressure increase by means of further compression of the springs.

The "live-loaded" packing construction for a valve described above, while providing a useful amount of self-adjustment to maintain the correct pressure through the packing onto the valve stem, has previously been determined to suffer from certain deficiencies detracting from its overall utility. One such deficiency is the need for longer bolts than would otherwise be required in order to accommodate the springs. The provision of such longer bolts requires sufficient clearance beyond the spigot or gland flange to accommodate such bolts and the corresponding springs, which in turn causes difficulties in fitting a "live-loaded" packing construction to existing valves. This particular deficiency is addressed by the live load valve assembly described in Applicant's prior U.S. Pat. No. 6,622,987 entitled LIVE LOAD ASSEMBLY FOR VALVE issued Sep. 23, 2003, the disclosure of which is incorporated herein by reference.

In U.S. Pat. No. 6,622,987, in one specific embodiment of the improved live-loaded packing construction, an integral spring construction is provided by one or more slots in the arms of the spigot, each such slot extending in a generally radial direction along a plane perpendicular to the axis of the sleeve. Due to the inclusion of the slots therein, the arm is effectively divided into branches which can be forced toward each other as a result of the tightening of a bolt that passes through them. The arm branches, in conjunction with the bolt, act as an integral spring that is capable of accommodating changes in the volume of the packing in a similar manner to that described above in relation to the use of the Belleville springs. In this regard, when the nut is tightened on its corresponding bolt, the branches of the associated arms are forced to deflect toward each other, or one may deflect towards the other, thereby maintaining a stored energy load which is transmitted to the packing. As is further described in U.S. Pat. No. 6,622,987, where this integral spring construction is provided by the slots and the arms of the spigot, the depth of each slot (i.e., the distance between the branches that it separates) may be made oversize to facilitate greater ease in its manufacture. In this oversized condition, to ensure that the correct amount of deflection of a branch toward a corresponding branch occurs, one or more appropriately sized washers or spacers can be fitted around the bolt to reside between the branches and thus reduce the slot depth. The maximum amount of branch deflection can thereby be controlled by selectively varying the size and/or number of spacers between the arm branches.

Though providing improvements over conventional live loaded packing construction, the integral spring construction embodiment described in U.S. Pat. No. 6,622,987 itself suffers from one particular drawback. More particularly, there is a susceptibility in such integral spring construction for an over-torque condition to arise as a result of the branches of each arm being forced too close to each other by the over tightening of the nut on the bolt that passes through them. In this regard, the over tightening the nut as causes one or both of the arm branches to bow or deflect too much toward the other may result in the application of an excessive level of radial pressure onto the valve stem, thus resulting in the sticking of the stem. Though such over-torquing of the nut(s) may be prevented by the placement of the above-described spacers between the branches of each arm in the above-described manner, the fitting of such spacers into the valve is time consuming and cumbersome due to the need to select the appropriate size and number of spacers to prevent an over-flexed condition in the branches from occurring. If such spacers are not used, the tightening of the nuts typically must be facilitated through the use of a torque wrench which is itself time consuming and cumbersome. The present invention, while providing the advantages of the integral spring construction described in U.S. Pat. No. 6,622,987, also eliminates the aforementioned deficiency by providing a live-loaded packing assembly for a valve which is specifically configured prevent the over-torquing condition described above from occurring, yet eliminates the need to use spacers or torque wrenches to tighten the nuts. These and other features and advantages of the present invention will be described in more detail below.

BRIEF SUMMARY OF THE INVENTION

In accordance with the present invention, there is provided a valve which comprises a valve body defining a passage having a valve stem moveably disposed therein and selectively moveable between open and closed positions. Extending about a portion of the valve stem is a packing. One end of a sleeve of the valve bears axially onto and compresses the packing, with a spigot of the valve being cooperatively engaged to and extending radially outward from the opposite end of the sleeve. A clamp of the valve is cooperatively engaged to the valve body, with at least two bolts extending between and being secured to the clamp, the spigot, and a flange member which is cooperatively engaged to the spigot. More particularly, each of the bolts extends between the clamp, a respective one of a pair of arms which are defined by the spigot, and a respective one of an opposed pair of flange portions which are defined by the flange member and extend angularly and in spaced relation to a corresponding arm of the spigot. The combination of the bolt, spigot and flange member provide an integral spring construction for the valve.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
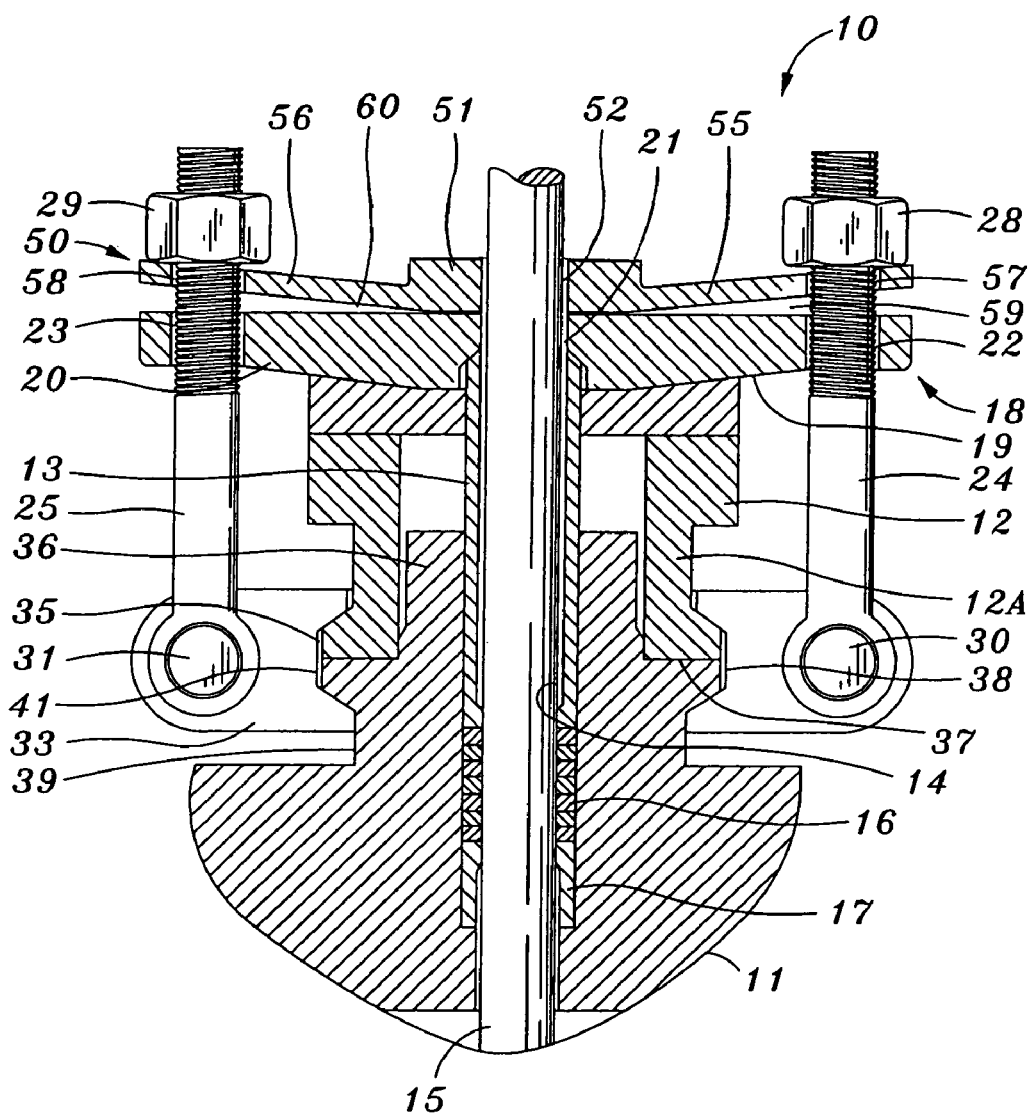
FIG. 1 is a cross-sectional view of a live-loaded valve construction in accordance with the present invention.

Referring now to the drawings wherein the showings are for purposes of illustrating a preferred embodiment of the present invention only, and not for purposes of limiting the same, FIG. 1 depicts a valve 10 including a live-loaded packing assembly constructed in accordance with the present invention. The valve 10 includes a body which itself comprises a bonnet 11 having a yoke 12 cooperatively engaged thereto. Extending axially through the bonnet 11 is a central passageway 14, a portion of which is defined by a tubular sleeve 13 which is inserted into the bonnet 11. Advanced through the passageway 14 is a valve stem 15, the movement of which opens and closes the valve 10 in a conventional manner. The lower end of the sleeve 13 (viewed from the perspective shown in FIG. 1) bears on and compresses an annular packing 16 which surrounds and exerts radial pressure on that portion of the stem 15 which passes through the packing 16. The packing 16 may be any suitable or conventionally used material or construction. Further, the packing 16 may be in the form of a multiplicity of rings of the packing material, and may include a lantern ring through which any leakage of fluid from the valve 10 can be channeled to a safe area instead of leaking to atmosphere.

In the valve 10, disposed beneath the packing 16 is an annular fixed ledge or body 17 against which the lower end of the packing 16 bears. Disposed at the upper end of the sleeve 13 is a gland spigot 18. The spigot 18 comprises an integral pair of arms 19, 20 which extend in radially opposed directions from the stem 15. The spigot 18 also includes a central bore 21 through which the stem 15 passes, as well as a pair of bores 22, 23 which are disposed in respective ones of the arms 19, 20 adjacent the outer ends thereof. The bores 22, 23 are sized and configured to receive respective ones of a pair of packing bolts 24, 25. As seem in FIG. 4, the spigot 18 also includes a pair of alignment pins 26, 27 which protrude substantially perpendicularly from the generally planar top surface thereof. Pins 26, 27 are disposed in close proximity to the central bore 21, and are separated from each other by an interval of approximately 180°.

Figure 3:
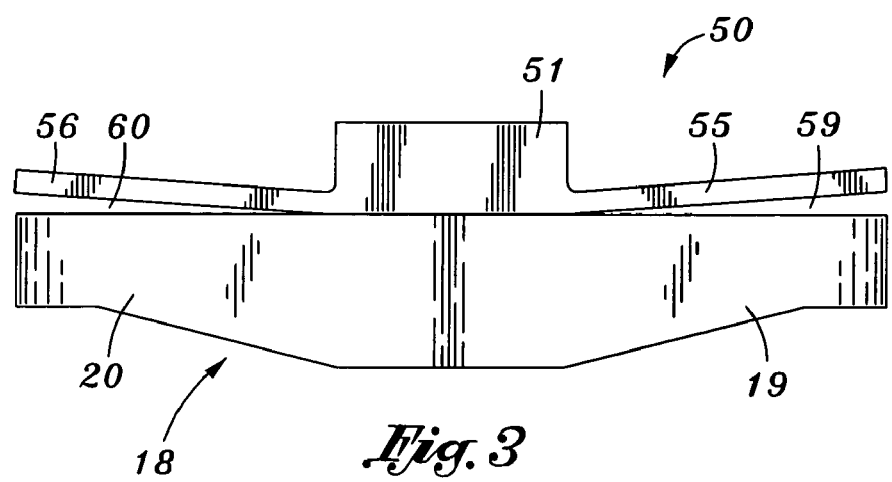
FIG. 3 is a side-elevational view of the spigot and flange assembly of the valve construction shown in FIG. 1.
Figure 4:
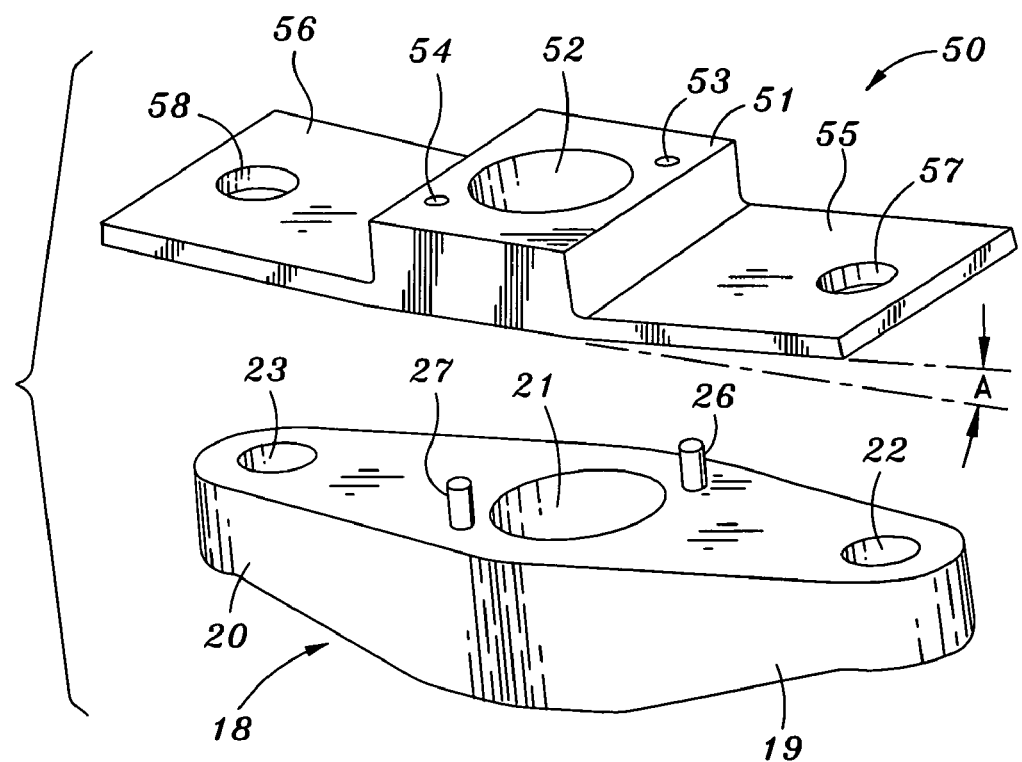
FIG. 4 is an exploded view of the spigot and flange assembly shown in FIG. 3.

Cooperatively engaged to the spigot 18 is a flange member 50 of the valve 10. The flange member 50 includes a generally quadrangular (e.g., square) central section 51 having a central bore 52 extending therethrough. Also extending through the central section 51 is a pair of alignment apertures 53, 54. The apertures 53, 54 are disposed proximate the central bore 52, and are also separated from each other at an interval of approximately 180°. Protruding outwardly from respective ones of an opposed pair of sides or faces of the central section 15 is an integral pair of flange portions 55, 56. As seen in FIGS. 1, 3 and 4, the flange portions 55, 56 do not extend perpendicularly from the corresponding vertical sides or faces of the central section 51, but rather are slightly angled relative thereto. As best seen in FIG. 4, the angular elevation A of each flange portion 55, 56 relative to the central section 51 is typically in the range of from about 2° to about 6°, and is preferably about 4°. Additionally, the thickness of each flange portion 55, 56 is typically in the range of about ⅛ inch to about ⅜ inches, and is preferably about ¼ inch. Disposed within and extending through the flange portion 55 in relative close proximity to the outer, distal end thereof is a bore 57. Similarly, disposed within and extending through the flange portion 56 in relative close proximity to the outer, distal end thereof is a bore 58.

In the valve 10, the engagement of the flange member 50 to the spigot 18 is facilitated by advancing the pins 26, 27 into respective ones of the apertures 53, 54. In this respect, the apertures 53, 54 have configurations which are complimentary to those of the pins 26, 27, the spacing/alignment of the apertures 53, 54 relative to each other allowing for the advancement of the pins 26, 27 thereinto. The receipt of the pins 26, 27 into respective ones of the apertures 53, 54 effectively coaxially aligns the central bore 21 of the spigot 18 with the central bore 52 within the central section 51 of the flange member 50. Similarly, the bores 22, 23 of the spigot 18 are coaxially aligned with respective ones of the bores 57, 58 disposed within the flange portions 55, 56 of the flange member 50. The central section 51 of the flange member 50 is abutted directly against the generally planar top surface of the spigot 18. However, since the flange portions 55, 56 are angularly oriented as described above, the abutment of the central section 51 against the spigot 18 results in the formation of a pair of slots 59, 60 which are defined between the upper surface of the spigot 18 and the lower surfaces of respective ones of the flange portions 55, 56. More particularly, as seen in FIG. 1, the slot 59 is located between the arm 19 and the flange portion 55, with the slot 60 being located between the arm 20 and the flange portion 56.

Figure 2:
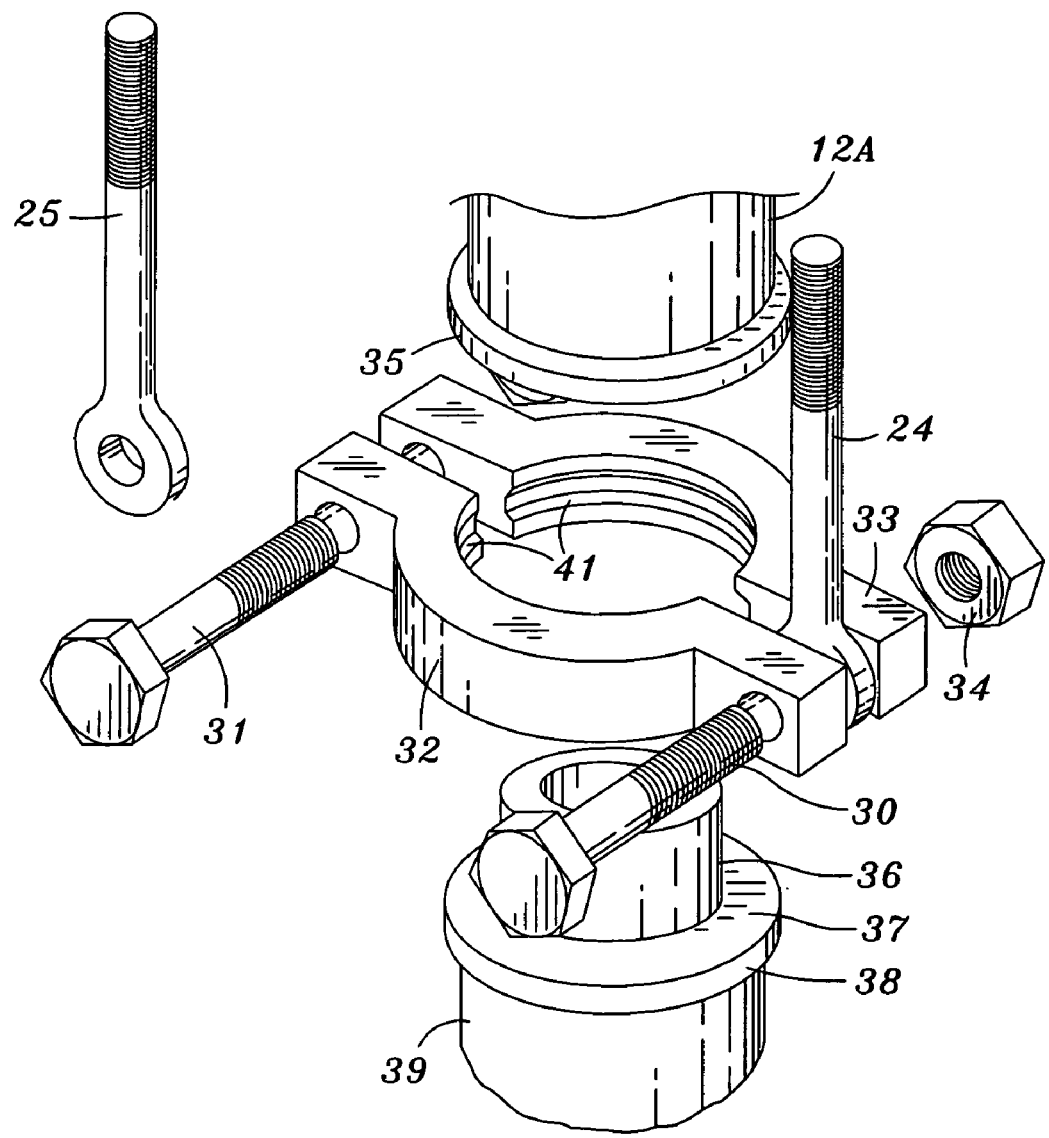
FIG. 2 is an exploded view of a portion of the valve construction shown in FIG. 1.

In addition to being advanced between the bores 22, 23, the packing bolts 24, 25 are further advanced through respective ones of the bores 57, 58 of the flange member 50 in the manner shown in FIG. 1. Threadably engaged to respective ones of the externally threaded upper end portions of the packing bolts 24, 25 is a pair of nuts 28, 29. The opposite, lower end portion of each bolt 24, 25 is enlarged and bored to receive of a respective one of a pair of clamping bolts 30, 31 in the manner shown in FIGS. 1 and 2. In the valve 10, clamping is achieved by the engagement of a split yoke clamp 32, 33 to the valve yoke 12 and bonnet 11. The yoke 12 includes a lower portion 12A which is annular and defines a radially outwardly extending, angled flange portion 35 at its lower extremity. The bonnet 11 has a stepped upper profile including an annular upper portion 36 which fits within the lower portion 12A of the yoke 12. The flange portion 35 of the yoke 12 sits upon a generally planar step 37 defined by the bonnet 11. More particularly, the step 37 is defined above as an angled, radially outwardly extending flange portion 38 of the bonnet 11 which transitions to annular neck portion 39 of the bonnet 11. The flange portions 35, 38 are retained within a corresponding annular recess 41 collectively defined by the clamp 32, 33, the clamp 32, 33 thereby holding the valve body parts together. As will be recognized, the clamp 32, 33 is tightened by tightening the nuts 34 threadably engaged to the externally threaded end portions of the clamping bolts 30, 31 as shown in FIG. 2.

As explained above, in addition to being advanced between the bores 22, 23 of the spigot 18, the packing bolts 24, 25 are further advanced through respective ones of the bores 57, 58 of the flange member 50, with the nuts 28, 29 being threadably engaged to respective ones of the externally threaded upper end portions of the packing bolts 24, 25. The tightening of the nuts 28, 29 on the bolts 24, 25 effectively forces or flexes the flange portions 55, 56 toward respective ones of the arms 19, 20, and further causes the central section 51 to act against the spigot 18 in a manner facilitating the transmission of force to the packing 16 via the arms 19, 20 and sleeve 13. As explained above, such force, when transmitted to the packing 16, causes the packing 16 to radially engage the stem 15 extending therethrough.

Advantageously, the configuration of the spigot 18 and flange member 50 effectively prevents any over-torquing of the nuts 28, 29 since a natural limit is provided when the flange portions 55, 56 of the flange member 50 go flat. When the flange portions 55, 56 go flat, they engage the generally planar top surface of the spigot 18, and more particularly the generally planar top surfaces of respective ones of the arms 19, 20 of the spigot 18. Those of ordinary skill in the art will recognize that the angle A (and hence the sizes of the slots 59, 60) and/or the thickness of each of the flange portions 55, 56 may be increased or decreased depending on the desired stress level which is to result from the tightening of the nuts 28, 29 as causes the flange portions 55, 56 to go flat. In the arrangement shown in FIG. 1 (i.e., each angle A is about 4° with the thickness of each of the flange portions 55, 56 being about ¼ inch), the flattening of the flange portions 55, 56 will occur upon the application of approximately fifty foot pounds of torque to each of the nuts 28, 29. As indicated above, such angles A and/or the thicknesses of the flange portions may be tuned (increased or decreased) as needed to satisfy the requirements of a particular application. The over-torquing prevention provided by the combination/assembly of the spigot 18 and flange member 50 is achieved without the need to resort to the use of a torque wrench to tighten the nuts 28, 29 or to insert spacers into the slots 59, 60.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A valve comprising:
   a valve body defining a passage;
   a valve stem moveably disposed within the passage and selectively moveable between open and closed positions;
   a packing extending about a portion of the valve stem;
   a sleeve having opposed first and second ends, the first end of the sleeve bearing axially onto the packing;
   a spigot cooperatively engaged to the second end of the sleeve and extending radially outward therefrom, the spigot defining a central bore which is coaxially aligned with the passage and adapted to moveably receive a portion of the valve stem;
   a flange member cooperatively engaged to the spigot and defining a central bore which is coaxially aligned with the passage and adapted to moveably receive a portion of the valve stem, at least a portion of the flange member extending in spaced relation to the spigot;
   means included on the spigot and the flange member for maintaining the central bores thereof in substantial coaxial alignment with each other;
   a clamp cooperatively engaged to the valve body; and
   at least one bolt extending between the clamp, the spigot and the flange member;
   the bolt, the spigot and the flange member providing an integral spring construction.

2. The valve of claim 1 wherein:
   the spigot comprises a pair of integrally formed arms which extend diametrically across the sleeve in opposed relation to each other;
   the flange member comprises an opposed pair of flange portions which extend along and in spaced relation to respective ones of the arms of the spigot; and
   at least two bolts extend between the clamp and respective ones of the arms and the flange portions.

3. The valve of claim 2 wherein:
   the sleeve defines an axis;
   each of the arms of the spigot extends in a radial direction along a plane which is generally perpendicular to the axis of the sleeve; and
   each of the flange portions of the flange member extends along a plane which is angularly offset relative to the axis of the sleeve.

4. The valve of claim 3 wherein each of the flange portions extends at an angle in the range from about 2° to about 6° relative to a respective one of the arms of the spigot.

5. The valve of claim 4 wherein each of the flange portions extends at an angle of approximately 4° relative to a respective one of the arms of the spigot.

6. The valve of claim 5 wherein each of the flange portions has a thickness in the range of from about ⅛ inch to about ⅜ inches.

7. The valve of claim 6 wherein each of the flange portions has a thickness of approximately ¼ inch.

8. The valve of claim 3 wherein the flange member includes a central section having the central bore disposed therein, the flange portions being integrally connected to and extending outwardly from respective ones of an opposed pair of sides defined by the central section.

9. The valve of claim 8 wherein the alignment means comprises:
   a plurality of alignment apertures disposed in the central section of the flange member; and
   a plurality of alignment pins protruding from the spigot and received into respective ones of the apertures of the flange member;
   the receipt of the pins into the apertures maintaining the central bores of the spigot and the flange member in substantial coaxial alignment with each other.

10. The valve of claim 1 wherein the spigot and flange member are each formed from a material selected from the group consisting of:
    a heat-treated alloy steel; and
    a precipitation hardened stainless steel.

11. The valve of claim 1 wherein the packing is fabricated from a multiplicity of rings.

12. A valve comprising:
    a valve body;
    a valve stem moveably disposed within the valve body and defining an axis;
    a packing extending about a portion of the valve stem;
    a spigot cooperatively engaged to the packing, the spigot defining a central bore which is coaxially aligned with the axis and adapted to moveably receive a portion of the valve stem;
    a flange member cooperatively engaged to the spigot and defining a central bore which is coaxially aligned with the axis and adapted to moveably receive a portion of the valve stem, at least a portion of the flange member extending in spaced relation to the spigot;
    means included on the spigot and the flange member for maintaining the central bores thereof in substantial coaxial alignment with each other;
    a clamp cooperatively engaged to the valve body; and
    at least one bolt extending between the clamp, the spigot and the flange member;
    the bolt, the spigot and the flange member providing an integral spring construction.

13. The valve of claim 12 wherein:
    the spigot comprises a pair of integrally formed arms which extend in opposed relation to each other;
    the flange member comprises an opposed pair of flange portions which extend along and in spaced relation to respective ones of the arms of the spigot; and
    at least two bolts extend between the clamp and respective ones of the arms and the flange portions.

14. The valve of claim 13 wherein:
    each of the arms of the spigot extends in a radial direction along a plane which is generally perpendicular to the axis of the valve stem; and
    each of the flange portions of the flange member extends along a plane which is angularly offset relative to the axis of the valve stem.

15. The valve of claim 14 wherein the flange member includes a central section having the central bore disposed therein, the flange portions being integrally connected to and extending outwardly from respective ones of an opposed pair of sides defined by the central section.

16. The valve of claim 15 wherein the alignment means comprises:
    a plurality of alignment apertures disposed in the central section of the flange member; and
    a plurality of alignment pins protruding from the spigot and received into respective ones of the apertures of the flange member;
    the receipt of the pins into the apertures maintaining the central bores of the spigot and the flange member in substantial coaxial alignment with each other.

17. The valve of claim 14 wherein each of the flange portions extends at an angle in the range from about 2° to about 6° relative to a respective one of the arms of the spigot.

18. The valve of claim 17 wherein each of the flange portions has a thickness in the range of from about ⅛ inch to about ⅜ inches.

\* \* \* \* \*